United States Patent [19]

Scherm et al.

[11] 3,723,446

[45] Mar. 27, 1973

[54] αHALOPENOXY-ISOBUTYROYL-β-NICOTINOYL-GLYCOLS AND PROCESSES THEREFOR

[75] Inventors: Arthur Scherm, Bad Homburg v.d.H.; Dezso Peteri, Frankfurt/Main, both of Germany

[73] Assignee: Merz & Co. Chemische Fabrik, Frankfurt-am-Main, Germany

[22] Filed: Aug. 12, 1970

[21] Appl. No.: 63,344

[30] Foreign Application Priority Data

Aug. 13, 1969 Germany............P 19 41 217.0

[52] U.S. Cl. .........260/295.5 R, 260/473 C, 424/266
[51] Int. Cl. .............................................C07d 31/36
[58] Field of Search ..............................260/295.5 R

[56] References Cited

OTHER PUBLICATIONS

Burger, Medicinal Chemistry, Third Edition, Part I, Wiley Interscience, Pages 50, 51 (1970). RS 403 B 8.
Gleason et al., Clinical Toxicology of Commerical Products, Third Edition, WIlliams & Wilkins, pages 100–105 and Cover Page Containing Toxicology Rating Chart; (1969) RA 1211 .65.

*Primary Examiner*—Alan L. Rotman
*Attorney*—Gordon W. Hueschen and Talivaldis Cepuritis

[57] ABSTRACT

α-Halophenoxy-isobutyroyl-β-nicotinoyl glycols are prepared by esterifying halophenoxy-isobutyric acid with ethylene glycol and then further reacting the obtained semi-ester with a nicotinic acid halide. The prepared compounds are useful as lipid-lowering agents.

2 Claims, No Drawings

α-HALOPENOXY-ISOBUTYROYL-β-NICOTINOYL-GLYCOLS AND PROCESSES THEREFOR

BACKGROUND OF THE INVENTION

Increased lipid values in the bloodstream are connected with the development of arterio-sclerosis, particularly of coronary sclerosis. An important goal of therapeutic measures in the case of hyperlipidemic conditions therefore, is the lowering of the increased triglyceride and cholesterol values.

Of the pharmaceuticals used up to this time for the treatment hyperlipidemic conditions, salts and the ethylester of the p-chlorophenyoxy-isobutyric acid show a lipid-lowering effect, predominantly with increased triglyceride and less with increased cholesterol values.

Nicotinic acid, on the other hand, acts predominantly on cholesterol values and is preferred therefore in the case of hypercholesterol conditions. Nicotinic acid additionally has an effect of furthering the circulation, which is frequently desirable in the case of treatment of hyperlipidemic conditions.

In the case of simultaneous use of p-chlorophenoxy-isobutyrates and nicotinic acid, one disadvantage, besides the different absorption rates of the two compounds, above all is, that the effect of the nicotinic acid lasts only for a short time and that side-effects occur frequently in the form of flushing phenomena (feeling hot, tingling of the skin, etc.)

SUMMARY OF THE INVENTION

Surprisingly, it is now found, that α-halophenoxy-isobutyroyl-β-nicotinoyl-glycol ester, especially α-(p-chlorophenoxy)-isobutyroyl-β-nicotinoyl-glycol ester is a compound which shows an effect on increased triglyceride and cholesterol values, whereby the portion of the p-chlorophenoxy-isobutyric acid is lower, but having the same lipid-lowering effect, than in the case of application of this compound alone, so that the possibility for side effects exists only to a small extent. At the same time, the side effects known from the nicotinic acid therapy (flushing) do not occur.

DESCRIPTION OF THE PREFERRED EMBODIMENTS

The invention relates to the novel compounds, mentioned above, and to a process for their production.

The two-step process, according to the invention has been characterized by the fact, that first halophenoxy-isobutyric acid is esterified with ethylene glycol in a mole ration of about 1:2, respectively, the semi-ester obtained is separated from the reaction medium, and is then reacted with a nicotinic acid halide.

Illustrative halophenoxy-isobutyric acids suitable for the process of the present invention are p-chlorophenoxy-isobutyric acid, p-bromophenoxy-isobutyric acid, p-iodophenoxy-isobutyric acid, and the like.

Suitable nicotinic acid halides are nicotinic acid chloride, nicotinic acid bromide, nicotinic acid iodide, and the like.

EXAMPLE

1 Mole of p-chlorophenoxy-isobutyric acid is stirred with 2 moles ethylene glycol in the presence of 0.05 mole of 85% phosphoric acid and 0.05 mole of p-toluene sulfonic acid at 120° C. for about 3 hours. After complete esterification the obtained de-posit is dissolved in ether, washed with an approximately 5% aqueous soda solution until free from acid and the solution is dried with glowed sodium sulfate. After filtering and distilling off of the solvent, the semi-ester is obtained almost in theoretical yield.

1 Mole of the semi-ester is dissolved in three times the quantity of tetrahydrofuran and 1.1 mole of nicotinic acid chloride (dissolved in three times the quantity of hydrofuran) is added dropwise while stirring and cooling with ice. After about 2 hours, esterification is completed and the product begins to precipitate. After addition of the same quantity of acetic ester, the product is permitted to crystallize in a refrigerator overnight and thereafter the product is recovered.

Yield: 70% of theory,          m.p.: 100° C.

The α-(p-Chlorophenoxy)-isobutyroyl-β-nicotinoyl-glycol is a crystalline powder, which is suitable for the production of orally useable application forms, such as tablets, coated pills, soft gelatine capsules, hard gelatine capsules and the like. Tablets, coated pills and capsules can also be produced with delayed release of the effective substance.

We claim:
1. α-Halophenoxy-isobutyroyl-β-nicotinoyl glycol.
2. α-(p-Chlorophenoxy)-isobutyroyl-β-nicotinoyl-glycol.

* * * * *